United States Patent [19]

Stein

[11] Patent Number: 4,797,920
[45] Date of Patent: Jan. 10, 1989

[54] ELECTRONIC FUNDS TRANSFER SYSTEM WITH MEANS FOR VERIFYING A PERSONAL IDENTIFICATION NUMBER WITHOUT PRE-ESTABLISHED SECRET KEYS

[75] Inventor: Theodore Stein, New Rochelle, N.Y.

[73] Assignee: MasterCard International, Inc., New York, N.Y.

[21] Appl. No.: 44,887

[22] Filed: May 1, 1987

[51] Int. Cl.$^4$ .......................... H04L 9/00; G07D 7/00
[52] U.S. Cl. ................................. 380/24; 340/825.34
[58] Field of Search ......................................
380/APS 23:APS 24:APS 25, APS 30;
340/825.34

[56] References Cited

U.S. PATENT DOCUMENTS

| | | |
|---|---|---|
| 3,654,604 | 4/1972 | Crafton . |
| 3,956,615 | 5/1976 | Anderson et al. . |
| 4,264,782 | 4/1981 | Konheim . |
| 4,281,215 | 7/1981 | Atalla . |
| 4,288,659 | 9/1981 | Atalla . |
| 4,302,810 | 11/1981 | Bouricius et al. . |
| 4,317,957 | 3/1982 | Sendrow . |
| 4,386,266 | 5/1983 | Chesarek . |
| 4,408,203 | 10/1983 | Campbell . |
| 4,423,287 | 12/1983 | Zeidler . |
| 4,438,824 | 3/1984 | Mueller-Schloer . |
| 4,578,530 | 3/1986 | Zeidler . |

*Primary Examiner*—Stephen C. Buczinski
*Attorney, Agent, or Firm*—Brumbaugh, Graves, Donohue & Raymond

[57] ABSTRACT

An electronic funds transfer system employs a means to verify a personal identification number PE entered by the user with the correct PIN (PT) stored at the host terminal. The remote and host terminals each generate an encryption key, and encrypt PE and PT at the respective terminals. These values are transmitted to the other terminal, where they are re-encrypted using the other encryption key. The double-encrypted numbers are then compared. The user-entered PIN can thus be verified without the need to share en encryption key between the remote and host terminals. The encryption transformation is of the type where the results of successive encryptions does not depend on the order of encryption.

7 Claims, 4 Drawing Sheets

ELECTRONIC FUNDS TRANSFER SYSTEM WITH MEANS FOR VERIFYING A PERSONAL IDENTIFICATION NUMBER WITHOUT PRE-ESTABLISHED SECRET KEYS

BACKGROUND OF THE INVENTION

In electronic funds transfer applications, it is customary to authenticate the originator of the transaction by use of a secret code, which is known to the originator of the transaction and is in some way verifiable by electronic equipment under control of the institution that controls the funds. This secret code is usually referred to as a "personal identification number" (PIN) or a password. For purposes of this patent application, these secret authentification codes shall be referred to collectively as a "PIN".

Verification requires that the PIN, which is keyed by the individual into an acquiring device at a remote terminal, be transmitted to a validating device located at the host terminal for comparison with the true PIN for that account. Often, the remote terminal is used by more than one host institution, and therefore the message containing the user's PIN must be transmitted first to a central network switch which then forwards the message to the proper host terminal.

The verification process must be carried out in such a manner that the PIN cannot be determined by gaining access to any information that is held in electronic storage or by intercepting any message along the paths of communication.

The security requirement is currently handled by encrypting the PIN at the point of entry into the system and keeping it encrypted at all times when it is held in electronic storage or when it is being transmitted between terminals. The device which performs the encryption is a separate electronic component which is secure against physical or electronic intrusions that would reveal any data held in the device. The device which verifies the PIN is similarly secure. The only time that the PIN may be in non-encrypted form is when it is within one of these devices.

The method of encryption that is in current general use employs an algorithm known as DES. DES was developed to encrypt text so that the clear text could be recovered only by authorized persons. It requires that a secret encryption key be held in common by the PIN entry device and the PIN verification device, or that there be a chain of encryption keys between the PIN entry device and PIN verification device, with the first key known to the PIN entry device and the last key known to the PIN verification device. Secrecy of the keys is more important than secrecy of PIN's since discovery of a key may compromise the security of all of the accounts at an institution or at several institutions. Except in the very simplest case (where entry and verification of the PIN occurs in the same terminal and therefore the same device functions as both the entry device and the verification device), secure control of the secret keys is the most troublesome and costly element of electronic funds transfer security.

A typical application of such devices occurs in electronic funds transfer. In this application the acquiring device is an automated teller machine or a bankcard point of sale terminal located at a retail merchant. In either case, the acquiring device reads data that is magnetically recorded in the bankcard, including the account number. The card-holder keys his secret PIN into the acquiring device and, in the ensuing electronic dialogue between the acquiring device and validating device, the validity of the PIN keyed into the acquiring device is determined.

Currently two methods are available for the purpose of validating the secret code, while protecting the secrecy of the code.

In the first method, all data which might lead to knowledge of the secret code is transmitted between the acquiring device and validating device in encrypted form. The encryption process uses an encryption key which must also be kept secret. If the acquiring device communicates directly wih the validating device, the key is held in common by the acquiring device and validating device. If the remote terminal is part of a network serving multiple hosts, and along the path between the acquiring device and the validating device there is a chain of intermediate devices, each intermediate device has two keys - one is held in common with the preceding device and one is held in common with the succeeding device. By means of a series of decryptions and re-encryptions the data is transmitted securely between acquiring device and validating device. This latter process is required in a network in which acquiring devices and validating devices are under administrative control of different organizations and cannot reasonably be expected to hold a key in common. In a large network with many endpoints, the problem of initially distributing common keys and periodically changing keys while maintaining key security is extremely difficult.

The second method also employs encryption of sensitive data. However, pre-established common keys are not used. Instead there is a preliminary dialogue between acquiring device and validating device which results in the establishment of a secure common encryption key. This is acceptable in some circumstances. However, there are applications with critical timing requirements for which the time required for the preliminary dialogue is unacceptable. In particular, the bankcard electronic funds transfer application is such an application.

It would be greatly desirable to reduce the problems associated with distributing and maintaining the security of encryption keys that must be shared among different terminals while at the same time carrying out the PIN verification process in a manner whereby the PIN is maintained secure when transmitted between terminals. It would also be desirable to avoid the series of encryptions and decryptions presently employed while transmitting PIN's through a network common to multiple organizations.

SUMMARY OF THE INVENTION

The present invention is a system for communicating data, e.g. an electronic funds transfer system, with means for validating a secret code which does not require the sharing of secret keys between the acquiring device and the validating device. Moreover, where the acquiring device is part of a network, PIN validation can be carried out as a direct dialogue between the acquiring terminal and the issuing host. The network has no participation, except for its role as a data conduit, and there is no need for encryption devices in the network. There is no key translation; there are no permanent keys to manage, and there is no requirement for a pre-established common key between any two points in the network. In fact, there is no need to store permanent key at all, since new keys can be generated for each transaction.

More particularly, a method of PIN verification according to the invention comprises the following steps:

1. The remote terminal generates a random key, A, and encrypts the user-entered PIN, PE, using an algorithm described below to produce A(PE). This result is sent to the issuer host.

2. The issuer host generates a random key, B, and encrypts A(PE), which it received from the terminal, using the same algorithm, to produce B(A(PE)). The issuer host also retrieves from data storage the true PIN, PT, and then encrypts PT under B, giving B(PT). Both B(A(PE)) and B(PT) are sent back to the remote terminal.

3. The remote terminal then encrypts B(PT) under A, yielding A(B(PT)). The terminal now has both A(B(PT)) and B(A(PE)). Because of the properties of the algorithm described below, these numbers will be equal if and only if PE = PT. The remote terminal need only compare the two encrypted results to determine if the user-entered PIN was correct. It need never know the actual value of PT.

The characteristic that is required of an encryption algorithm that will accomplish these results is that the final result of two successive encryptions, using a different key each time, should not depend on the order in which the encryptions occur. In addition, of course, it must have the usual cryptographic characteristics, that is, the transformation must be one to one, and the inverse of the transformation must be computationally infeasible.

A suitable algorithm for this purpose is exponentiation using arithmetic modulo m. A value m is selected as the largest value to be carried in the computation. To encrypt P under the key A, $P^A$ is calculated, letting the computed values wrap around zero whenever they exceed m, that is, the reduced value is the remainder which is left after division by the modulus.

In general, while $(P^A)^B$ equals $(P^B)^A$, the transformation under a modulus is not always one-to-one, i.e. $(P_1^A)^B$ mod m may be equal $(P_2^B)^A$ in certain cases when $P_1$ and $P_2$ are not equal. However, with certain known restrictions on m and P and A and B, it can be made one-to-one. In arithmetic under such a modulus, exponentiation follows the ordinary rules of algebra, that is, if two successive encryptions are carried out with different keys, the result is independent of the order in which the encryptions occur. However, the inverse operation of finding A when $P^A$ and P are known is computationally infeasible if the range of A is large enough. This would prevent an unauthorized person from determining the value of the PIN PE transmitted from the host, as described further on.

The exponential one-to-one transformation under a modulus is well known. It has been used in one application to develop a public key encryption algorithm called RSA. It has been used in another application to develop a method called SEEK, which is used as part of a key management technique for DES keys. Very fast chips have been developed for discrete exponentiation. Therefore, by employing such chips the execution of the encryption steps is not unduly time consuming.

For a better understanding of the invention, reference is made to the following detailed description of a preferred embodiment, taken in conjunction with the drawings.

DETAILED DESCRIPTION OF THE PREFERRED EMBODIMENTS

Figure 1:
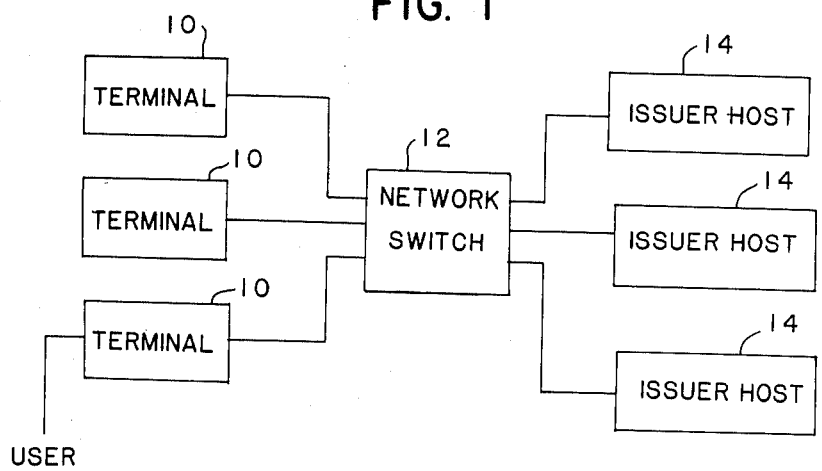
FIG. 1 is a block diagram representing a network of transaction terminals and issuer hosts.

FIG. 1 shows a typical network for electronic funds transfer, that includes a number of remote terminals 10, e.g. automated teller machines, connected to a central clearinghouse network switch 12. The switch 12 is linked to a number of card issuer hosts 14, e.g. computer terminals associated with different banks that share the network.

Figure 2:
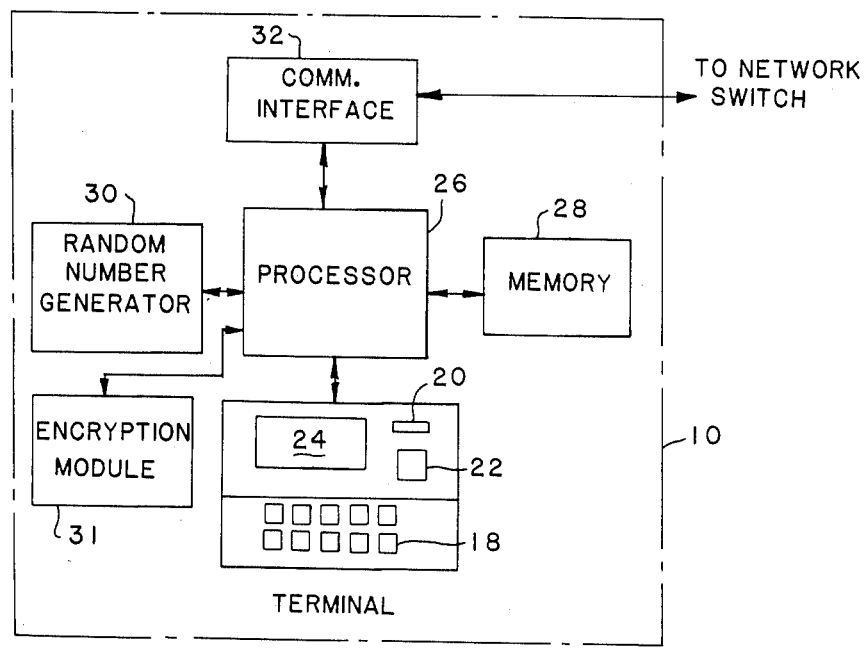
FIG. 2 is a schematic drawing of a transaction terminal according to the invention.

Referring to FIG. 2, a remote terminal 10 has an I/O device 16, that typically includes a keyboard 18, card reader slot 20, a cash dispenser 22 and a viewing screen 24. The I/O device 16 communicates with a processor 26. Memory chips 28, a random number generator 30, an encryption module 31, and communications interface devices 32 also communicate with the processor 26. Encryption module 31 is a chip of known type specially designed for carrying out exponentiation at high speeds. As described further below, memory device 28 is used for storing session keys and an encrypted PIN. Random number generator 30 generates a session key for each transaction, and encryption module 31 performs the encryption on the uses-entered PIN and encrypts (using the same algorithm and session key) an encrypted PIN received from the host. Processor 26, in addition to its normal terminal functions, is programmed to transmit PINs entered on keyboard 18 to the encryption module and compare encrypted PIN's for verification.

Figure 3:
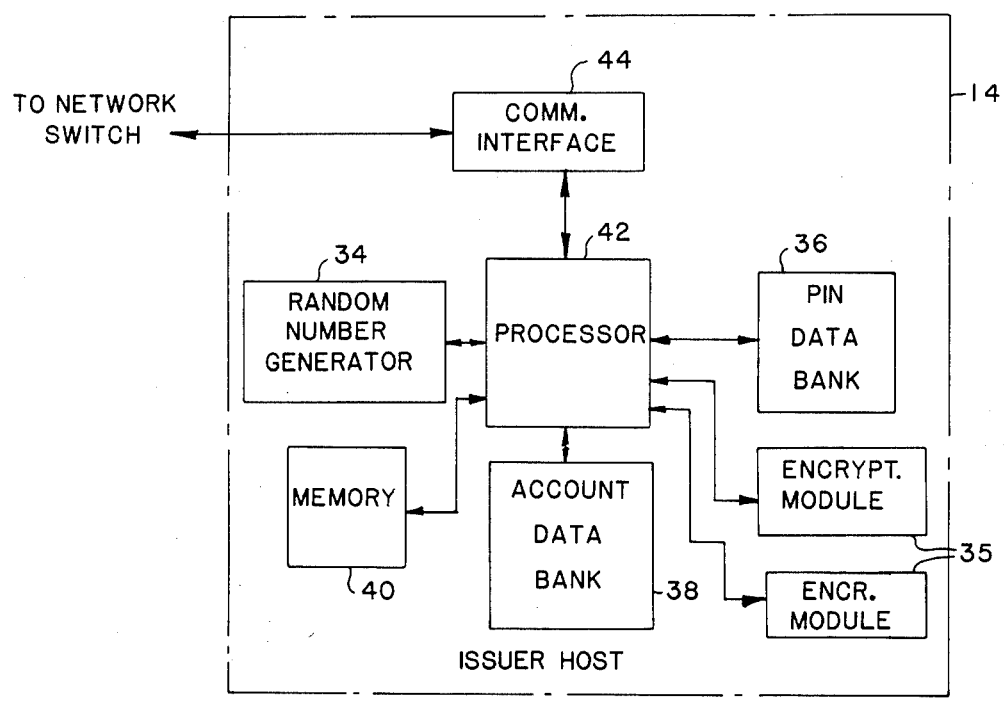
FIG. 3 is a schematic drawing of an issuer host according to the invention.

FIG. 3 shows schematically an issuer host 14. The host 14 includes a random number generator 34 and two encryption modules 35, a PIN data bank 36, an account data bank 38, and memory chips 40 linked to a processor 42. Communication interface devices 44 link the processor 42 to the network switch 12. Memory 40 stores the encryption algorithm, and may temporarily store the encrypted PIN's. Encryption module 35 encrypts, at the direction of the process or 42, the encrypted PIN received from the remote terminal 10, and encrypts the PIN recovered from PIN data bank 36.

In accordance with the present method, a user enters appropriate account information into a remote terminal 10, to initiate a transaction. This is usually done by inserting a credit card or bank card into the terminal card reader 20. The processor 26 then asks the user to enter the appropriate PIN (PE), as well as other information relative to the transaction, into the terminal. This is entered through keyboard 18. Once the processor 26 has the entered PIN (PE), the account is verified as follows:

1. The entry device 10 generates a random key, A, using generator 30, computes $PE^A$, and sends the result, along with account identification data, to the issuer 14.

2. The issuer's verification device 14 generates a random key, B, using generator 34, and applies it to the number received from the entry device, yielding $PE^{AB}$. The issuer's verification device also retrieves the correct PIN (PT) from the PIN data bank 36, and calculates $PT^B$. Both numbers are returned to the entry device 10.

3. Using $PT^B$ received from the issuer, the entry device 10 applies the key A and calculates $PT^{BA}$.

4. The entry device now has $PE^{AB}$ and $PT^{BA}$. These will be equal if, and only if, PE=PT.

In applications in which the acquiring device is a terminal which reads a card that has information recorded in some magnetic or other electronically readable form, an alternate procedure can be used. The key, V, for each Validating device can be held constant and V(CT) can be prerecorded in each card. The terminal will transmit A(CA) and receive V(C(A)) as above. The terminal will then read V(CT) from the card and compute A(V(CT)). The comparison then proceeds as above.

In this method, the PIN is encrypted by raising it to a power, which can take on a very large value, and reducing the result to a value which is less than some upper limit called the modulus. The reduced value is the remainder which is left after division by the modulus. Thus, if the number is N and the encryption key is K, the encrypted value is $N^K$, appropriately reduced. To be usable for cryptography, the transformation must be one-to-one. In general this is not the case for the exponential transformation reduced under a modulus. However, with suitable restrictions on modulus and exponent, it can be made one-to-one. To be secure, determination of K from a knowledge of N and $N^K$ must not be computationally reasonable. This problem has been subjected to extensive analysis by mathematicians and cryptographers and, to date, all methods of solving this problem require so much time on even the fastest of computers that they are of no practical value in an attempt to defeat the encryption scheme.

It can be shown that even though addition under the modulus is used, the familiar laws governing operations with exponents still apply. The special characteristic of this transformation which is exploited here is that if two successive encryptions are carried out with different keys, the result is independent of the order in which the encryptions occur. This follows from the well known algebraic relation $$(N^A)^B = (N^B)^A$$

In fact, both are equal to $N^{AB}$.

EXAMPLE

Figure 4:
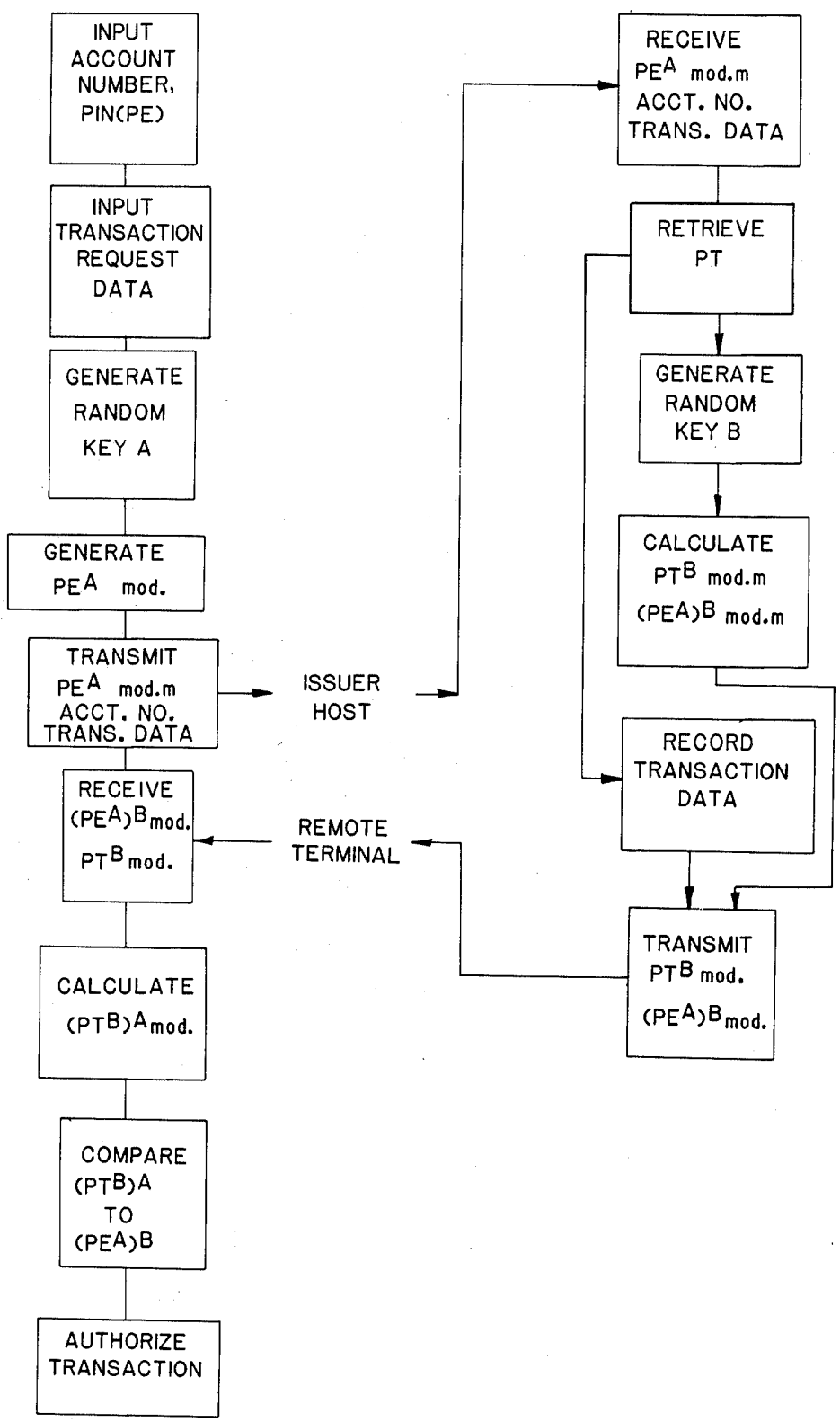
FIG. 4 is a block flow diagram of a method for PIN verification carried out by a system according to the invention.

A user inserts a bank card into the card reader slot 20, which initiates the program sequence set out in FIG. 4. After reading the account number and name from e.g. a magnetic stripe or integrated circuit chip on the card, the processor 26 requests (via a message on the screen 24) and the user enters the PIN, PE. The processor instructs the random number generator to generate a key A, and transmits PE and A to the encryption module. The processor 26 proceeds to request instructions as to the funds transfer to take place.

The encryption module has stored in it the encryption algorithm $PE^A$ mod m, as well as a value of m. The encryption is performed, and the reduced number is stored in memory 28, along with the key A, and transmitted by the processor 26, through communications interface 32, to the host terminal 14, along with the account number and upon receipt of this information by the host 14, its processor 42 directs the value $PE^A$ to one security module 35, instructs random number generator 34 to generate a key B, retrieves the true PIN PT from date storage 36, directs PT to the other security module 35 and B to both modules 35. Since the modules 35 are separate processors, the main processor can now proceed in parallel, while the two encryptions are taking place in the modules 35 (one in each module) to process the transaction proceeding in the account data bank 38.

According to the method described above, no key management is required by the issuer, the acquirer, or the organization which is responsible for the intermediate network. The dialogue is direct between the entry device and the verification device, and all encryption and decryption takes place in these devices. There is no encryption, decryption, or key translation in the acquirer's computer or in the network. The network serves only as a data conduit. The data can pass through several networks as easily as through one network.

In the encryption modules 35, and $PE^{AB}$ and $PT^B$ are derived and sent back to the remote terminal 10. Finally the remote processor 26 directs $PT^B$ to the security module, to determine $PT^{BA}$ mod m. This number is then compared by processor 26 to $PE^{AB}$ (stored in memory 28), and if verified the transaction is authorized.

Personal identification numbers are usually stored in encrypted form, e.g. in DES format. Therefore, it may be necessary for security module 35 to decrypt the true PIN PT, using the appropriate key, prior to performing the encryption $PT^B$.

Also, concerns about the relative insecurity of retail POS terminals are eliminated. No secret information is retained in the terminal. Penetrating the terminal will reveal nothing of value in the perpetration of a fraud. The keys change on every transaction and are not retained after completion of the transaction.

In the foregoing exemplary embodiment, the PIN is verified in the terminal rather than in the issuer's computer. If PIN verification fails, then the issuer must know this in order to avoid debiting the cardholder account. The mechanism for this is already available in electronic funds transfer (EFT) systems. Every EFT system must provide for notification to the issuer if communication with the terminal is lost after an issuer has authorized a transaction. When this happens, the system will either deliver a reversal or a negative confirmation to the issuer, depending upon the method in use. The same mechanism can be used to notify the issuer that PIN verification has failed, i.e., failure of PIN verification is treated like a communication break. This requires no change in the nature of the communication between the terminal controller and the issuer. However, there is a change in the communication between the terminal controller and the terminal. To be assured of PIN verification, the terminal controller will require an application level acknowledgment from the terminal in addition to the communication level acknowledgment which is currently received.

It may be desirable on PIN bearing transactions to have a mandatory third leg in order to confirm PIN verification to the issuer. For greater security, to guard against terminal malfunction or deliberate merchant fraud, the terminal may return a secure encrypted confirmation message.

Figure 5:
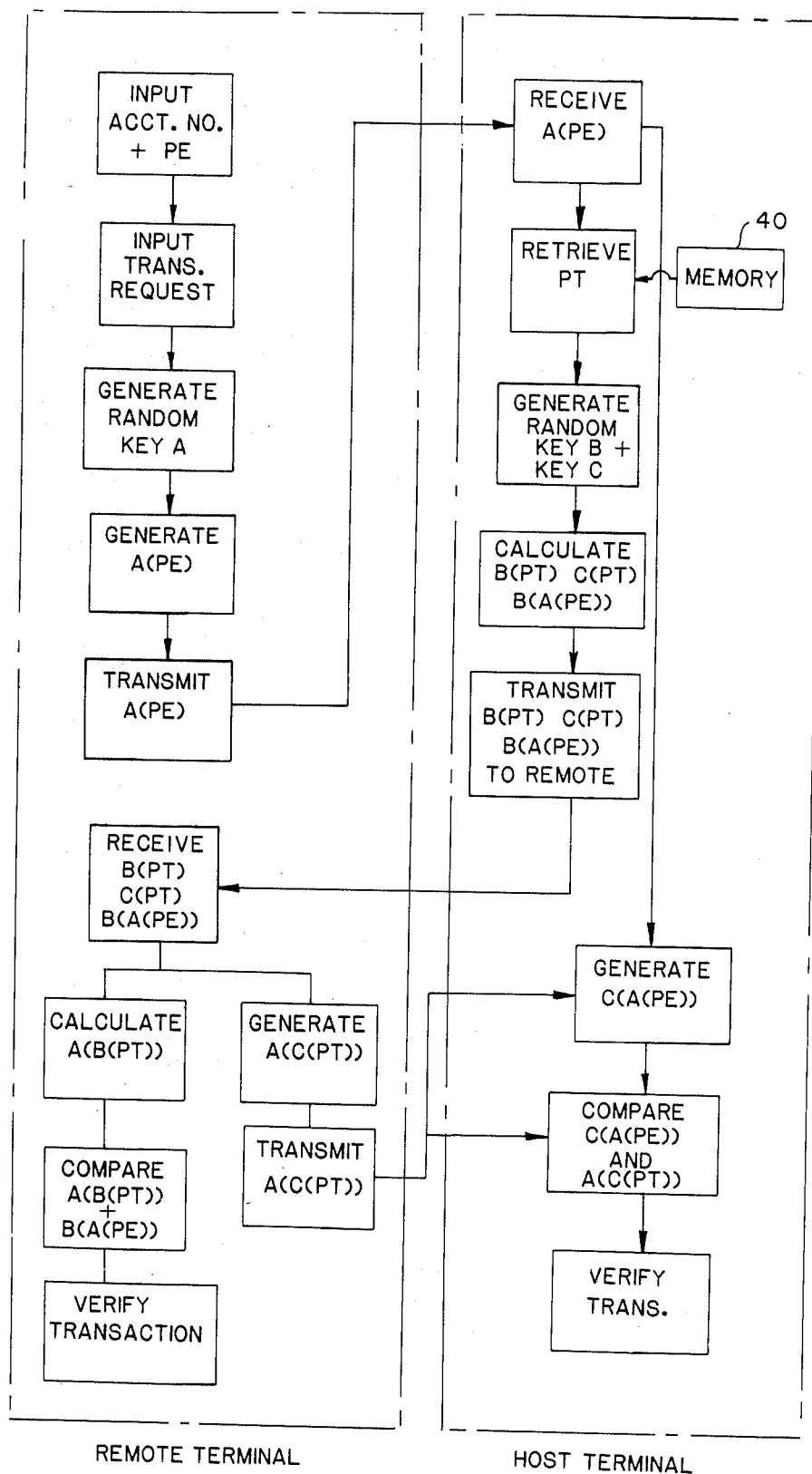
FIG. 5 is a block flow diagram of an alternative method for PIN verification according to the invention.

As an alternative embodiment, shown in FIG. 5, in step 2 of the procedure as previously described, the issuer's verification device generates an additional random key, C calculates $PT^C$, and sends this to the terminal along with the other number. After Step 4, the terminal sends a confirmation message to the issuer. The confirmation message contains $PT^{CA}$. The issuer's verification device calculates $PE^{AC}$ and compares this with $PT^{CA}$. If they are equal, the issuer knows that the entered PIN was correct. In this way, the issuer independently verifies that the correct PIN was entered at the terminal.

In order to protect against unauthorized terminals, it would be possible to establish a secret key that is known only to the terminal controller and the terminals. This key would not be used for PIN encryption. It would be used only to assure the terminal that the response had come from the terminal controller. The use of this key would be localized between an acquirer and his terminals. An alternate scheme would be to use a "public" key scheme in which the terminals contain keys which need not be kept secret and the terminal controller contains a secret key. The terminals can use their public keys to verify that a message actually came from the terminal controller since only the terminal controller knows the secret key that correspond to the public key. The public key is easier to manage because there is no requirement for secrecy.

If an unauthorized person were to record the dialogue between terminals, the numbers $PE^A$, $PE^{AB}$ and $PT^B$ would be recovered. If that person could discover the value of B, the value of PT could be calculated. However, the value of B cannot be determined from $PE^A$ and $PE^{AB}$ in a computationally reasonable fashion, and PT is secure.

The foregoing description is exemplary. Variations and modifications will be apparent to persons skilled in the art, and are intended to be within the scope of the invention as set forth in the following claims.

I claim:

1. A method of operating an electronic funds transfer of the type having at least one remote terminal and at least one issuer host terminal, comprising the steps of:
   (a) accepting at the remote terminal account identification data and a personal identification number PE from a user;
   (b) providing a first key A at the remote terminal;
   (c) encrypting PE using encryption key A to derive A(PE);
   (d) transmitting A(PE) to the host terminal;
   (e) providing a second key B at the host terminal;
   (f) encrypting A(PE) at the host terminal using encryption key B to derive B(A[PE]);
   (g) providing at the host terminal the value of B(PT) which is the correct personal identification number PT encrypted using an encryption key B;
   (h) transmitting B(A[PE]) and B(PT) from the host terminal to the remote terminal;
   (i) encrypting B(PT) at the remote terminal using encryption key A to derive the value A(B[PT]);
   (j) comparing the value of A(B[PT]) to B(A[PE]);
   (k) executing an electronic funds transaction responsive to the values of A(B[PT]) and B(A[PE]) being the same;
   wherein each encrypting step is executed with the same algorithm, and wherein the algorithm effects a transformation such that, with two successive encryptions using two different keys the result is the same irrespective of the order of encryption.

2. A method according to claim 1, wherein the encryption comprises an exponential transformation.

3. A method according to claim 2, wherein the encryption comprises an exponential transformation under a modulus.

4. A method according to claim 1, wherein step (g) comprises the steps of storing PT in a memory accessible by the host terminal, retrieving PT responsive to the receipt of A(PE), and encrypting PT using the encryption key B at the host terminal to derive B(PT).

5. A method according to claim 4, wherein steps (b) and (g) comprise providing encryption keys A and B by generating a first and second random number, respectively, for each transaction.

6. A method according to claim 1, comprising the steps of generating a second random key C at the host terminal; encrypting PT with the key C to derive C(PT); transmitting C(PT) to the remote terminal; encrypting C(PT) at the host terminal with the key A to derive A(C[PT]); transmitting A(C[PT]) to the host terminal; encrypting A(PE) at the host terminal with the key C to derive C(A[PE]); and comparing C(A[PE]) with A(C[PT]) at the host terminal to verify PIN independently at the host terminal.

7. An electronic funds transfer system comprising means for carrying out the steps of claim 1.

* * * * *